Feb. 4, 1941.  G. A. TINNERMAN  2,230,916

SHEET METAL NUT

Filed Jan. 7, 1939   2 Sheets-Sheet 1

Inventor
GEORGE A. TINNERMAN
By H. A. Lombard,
Attorney

Feb. 4, 1941.     G. A. TINNERMAN     2,230,916
SHEET METAL NUT
Filed Jan. 7, 1939     2 Sheets-Sheet 2
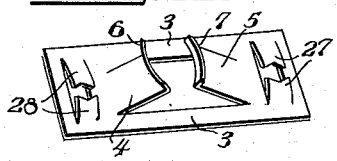
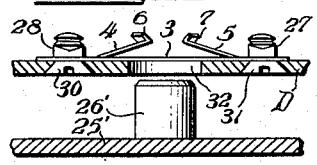
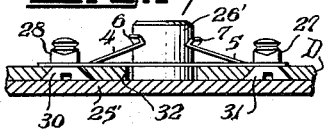
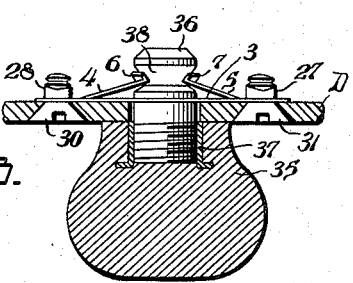
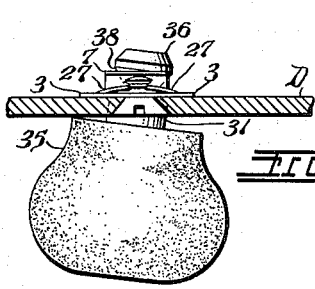
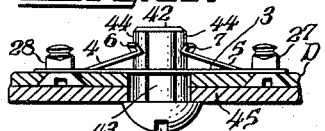
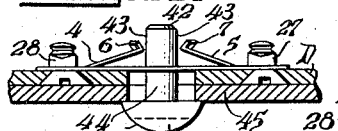
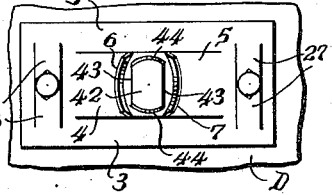
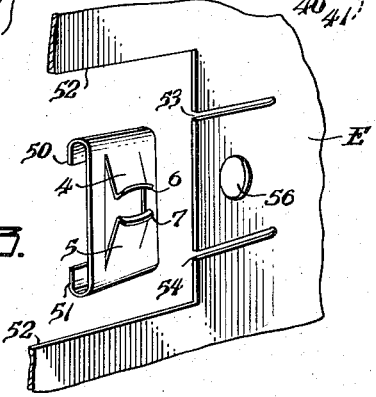
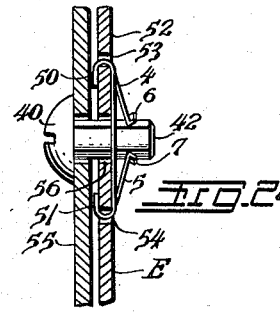
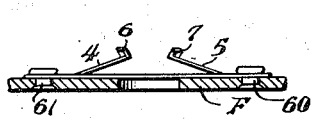
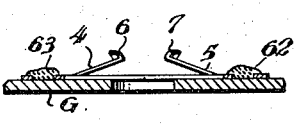
Inventor:
GEORGE A. TINNERMAN
By H. G. Lombard,
Attorney Patented Feb. 4, 1941

2,230,916

UNITED STATES PATENT OFFICE 2,230,916

SHEET METAL NUT

George A. Tinnerman, Rocky River, Ohio, assignor, by mesne assignments, to Tinnerman Products, Inc., Cleveland, Ohio, a corporation of Ohio Application January 7, 1939, Serial No. 249,818

4 Claims. (Cl. 85—36)

This invention relates in general to improved spring nut fastening devices designed for use with cooperating bolt or stud fastenings and adapted to be embodied in numerous installations in lieu of screw threaded nuts and the like as a means for easily and quickly securing the parts of an assembly under spring tension in fixed, rigid relation against accidental displacement or unintentional removal.

The present application claims the invention in the new and improved structure of the spring nut devices per se as fasteners of general utility, while a copending divisional application Serial Number 373,501, filed January 7, 1941, claims the invention residing in the structure of the improved forms of bolt or stud fastenings as constructed for special coaction with such spring nut devices in the manner of combined, cooperating spring nut and stud fastening members for providing a locking but releasable substantial spring coupling securing means having an automatic, self-tightening action, and with said fastening members being readily separable to permit the parts secured thereby to be disassociated and resecured as often as may be necessary or desirable.

More particularly, the present invention is directed to an improved spring fastening means of the type wherein a spring nut is expeditiously connected to a cooperating bolt fastening by a simple pressing operation thereon or by a substantial axial straight thrust of the bolt fastening to operative fastening engagement with the spring nut in providing a securing means in which the fastening members may not be separated from applied fastening position except by a suitable, generally predetermined force on the bolt or substantial pull on the spring nut.

As shown in a number of my prior patents, various types of spring nut devices are designed to provide highly practical, substantially locked fastening installations employing the well known common threaded bolts or screws. Generally, such fastening members cannot be removed except by the usual relative rotary movement to separate the thread engaging elements thereof and this not only involves an objectionable, time consuming procedure but often results in a deformation and mutilation of the thread engaging elements of the spring nut beyond further efficient and satisfactory use.

Many installations require a spring nut fastening having positive locking characteristics and otherwise capable of providing a rigid, tightened assembly of the parts secured under spring tension, yet which is operative to effect an easy, quick release of the fastening members in a minimum of time and effort. One of the primary objects of the present invention is to provide a spring nut fastening means which may be embodied in practically any installation to supplant the usual nut, threaded bolt and lock washer assembly, and which will function in a manner to permit an easy, quick release and ready separation from its cooperating bolt fastening without becoming mutilated or distorted such that the same may be frequently removed and again employed in the same or similar installation any number of times over a long period of use.

Another principle object of the invention is to provide an improved fastening means of this character for positively securing a member to a supporting part in an installation and which will permit of a ready detachment of the fastening members by a relatively simple operation without in any way damaging the parts secured or the fastening means such that the installation may be mounted and dismounted as necessary any number of times without diminishing the efficiency thereof.

Still another object of the invention is to provide an improved spring nut fastening means which may be embodied in self-sustaining relation in various installations comprising parts to be releasably secured, and also in structures in which one of the parts so secured is not conveniently or readily accessible from the reverse side thereof in what is known as a blind location.

Further objects and advantages and other new and useful features in the construction, arrangement and general combination of parts of the invention will be readily apparent to those skilled in the art as a description thereof proceeds with respect to the accompanying drawings in which like reference characters designate like parts throughout the same, and in which:

Fig. 15 is a perspective of a further form of the spring nut provided with auxiliary securing means for attaching the same in self-sustaining position on a part such as a structural member in a blind location in which the reverse side thereof is inaccessible in a completed installation;

Fig. 16 is a sectional view representing such an installation and in which a member provided with a substantially smooth connecting stud is shown about to be applied in mounted position;

Fig. 17 is a view similar to Fig. 16 showing the respective parts in fully assembled relation;

Fig. 18 is a sectional view of an installation of this character employing a grooved bolt fastening for providing a substantially positive locked mounting for a handle or the like on a supporting part;

Fig. 19 is a side view of Fig. 18 showing the initial step in the operation for separating the parts of the installation, if desired;

Fig. 20 is a sectional view of a further embodiment of the invention in which a bolt fastening comprising a shank having reduced areas is employed for effecting a quick release of the parts secured;

Fig. 21 is a similar view showing the bolt as rotated substantially ninety degrees to position the shank for ready removal from the spring nut fastening member;

Fig. 22 is a top plan view of Fig. 21;

Figure 1:
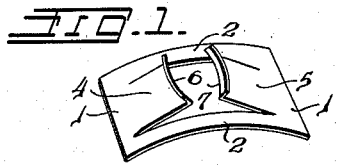
Fig. 1 is a perspective of one form of the improved spring nut fastening device of the invention comprising a generally concave base when normally untensioned.

Figs. 23 to 26 inclusive illustrate various alternate means for attaching the spring nut to the reverse side of a supporting part in blind locations, for example, Fig. 23 showing a form of the spring nut provided with clip holding elements at either end thereof about to be applied to slots provided in such a supporting part;

Fig. 24 is a sectional view showing a completed assembly embodying a spring nut attached to the supporting part as illustrated in Fig. 23; and Fig. 25 shows a spring nut attached to a supporting part by rivets or the like, while Fig. 26 represents still another arrangement obtained by suitable spot welding of the spring nut to the structural part.

The improved spring nut fastening means per se of the invention, may be provided as integral elements in any sheet metal structural member, or may assume the form of a sheet metal fastening or locking plate usable in the manner of a substantial spring nut. In the latter respect, there is a much wider range and variety of uses and accordingly, it is to be understood that though the description which follows refers to the various embodiments of the fastening means as spring nuts, it is fully contemplated that the essential features and characteristics thereof be embodied as the fastening means in any equivalent structure secured by a bolt or stud fastening device whether a separate shank member or integral connecting stud element or the like.

A spring nut in accordance with the invention may be provided of any size or shape but is preferably formed from an inexpensive, substantially rectangular section of metal which may be obtained at minimum cost from ordinary sheet metal strip stock without loss or waste of material whatsoever. Any type of sheet metal may be employed but preferably that of a spring metal nature such as tempered spring steel or cold rolled steel having spring-like characteristics. By suitable slitting, bending and forming operations, the sheet metal section comprising the spring nut is provided with projecting bolt engaging means in the manner of tongues or the like having substantial cam lips formed thereon for frictionally and grippingly engaging the bolt connected thereto in applied fastening position, but permitting a quick, easy release therefrom in a manner presently to be described. It will be understood that such tongues are designed to yield in permitting the bolt to be readily passed therethrough in one direction to applied fastening position in which relation the spring nut is effective to provide a rigid, tightened installation under continuously effective spring tension. In such applied fastening position of the bolt and spring nut, any ordinary axial movement of the bolt toward disengagement or removal from the spring nut not only is prevented but also results in a movement of the tongues toward each other in a direction to diminish the space therebetween and otherwise cause the cam lip extremities thereof to even more positively engage the bolt and prevent withdrawal thereof.

Referring now, more particularly to the drawings, Fig. 1 shows one preferred form of the improved spring nut which is constructed of a plate-like section of spring metal suitably stamped to provide substantial end portions 1 joined by side or bridge portions 2 between which bolt engaging tongues 4, 5, extend upwardly with their free ends formed into substantial cam lips 6, 7 designed to supply a positive, substantially locked gripping relation with the cooperating bolt fastening in applied fastening position and at the same time, permit an easy quick release therefrom as hereinafter set forth.

The body or base of the locking plate defined by the end and side portions 1, 2 is somewhat flexible and is so formed in the stamping operation as to have a pronounced, generally concave configuration in normal, untensioned relation. Since the body of the spring nut is flexible, the tongue elements thereof are necessarily relatively yieldable with respect to each other and readily adapted for sliding engagement with the shank of the bolt in one direction in the manner of a clutch, and accordingly, may be speedily applied to fastening position by a substantial axial, thrust-like motion in a minimum of time and effort and the generally concave body of the device flattened in such fastening poistion thereby fixedly securing the fastened parts of an installation under continuously effective spring tension.

Figure 2:
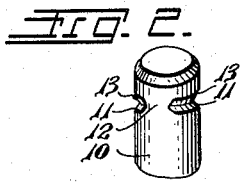
Fig. 2 is a fragmentary perspective of the shank of a form of bolt fastening which may be employed with the spring nut shown in Fig. 1.

The bolt fastening which may be employed is preferably a rivet-like, threadless shank member having a diameter slightly greater than the space between the cam lip extremities 6, 7 of the tongues such that an effective fastening engagement is obtained even when the shank of such a bolt fastening is plain and smooth throughout its length. However, as shown in Fig. 2, in order to provide for a positive locked fastening engagement, the bolt fastening shank 10 is preferably formed with opposed grooves or recesses 11, separated by unindented areas 12. Said recesses are provided of course, at suitable predetermined points on the bolt shank in accordance with the combined thickness of the parts secured and present shoulders 13 against which the cam lip extremities 6, 7 of the tongues of the spring nut are designed to abut in providing a rigid, positive, locked fastening engagement. The bolt fastening otherwise may be tapered at its leading end to provide a substantial pilot readily introduced between the tongues of the spring nut, while the opposite end thereof is provided with any suitable head having a tool recess 14.

Figure 3:
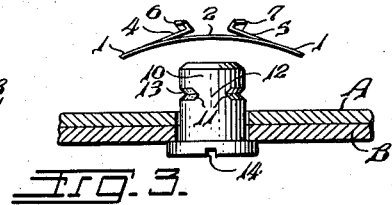
Fig. 3 is a sectional view of an installation comprising superposed apertured parts to be secured by the spring nut and bolt fastening members of Figs. 1 and 2.

From the foregoing, it will be understood that when the spring nut and bolt fastening just described are employed as the means for securing an installation comprising, for example, superposed parts A, B having aligned apertures, the shank 10 of the bolt is passed through such apertures from one side thereof to project onto the opposite side thereof for operative engagement with the tongues of the spring nut substantially as shown in Fig. 3.

Figure 4:
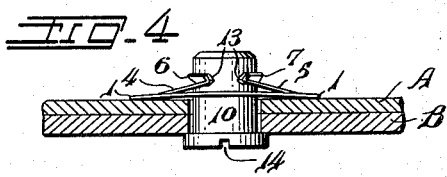
Fig. 4 is a similar view showing the spring nut as applied to positive fastening engagement with the bolt fastening to secure the parts under spring tension.
Figure 5:
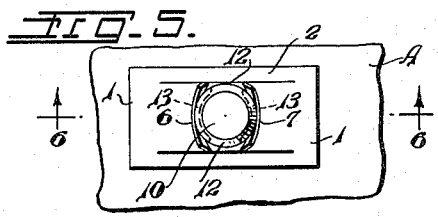
Fig. 5 is a top plan of Fig. 4.
Figure 6:
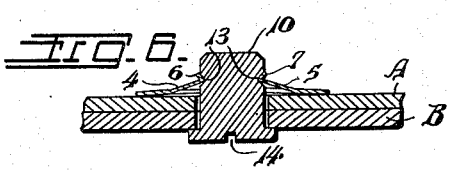
Fig. 6 is a section taken on line 6—6 of Fig. 5.

Referring to Figs. 4, 5 and 6 it will be appreciated that when the spring nut is applied to the projecting shank of the bolt fastening and pressure exerted in a substantial axial, thrust-like movement, the yieldable tongues 4, 5 thereof are caused to slide along the bolt shank to the point at which the end portions 1 of the generally concave base, contact the adjacent surface of the structural part A. At such point, upon continued pressure on the bowed side portions 2 of the spring nut, the said end portions are moved from their initial, normally untensioned position in the generally concave base outwardly and upwardly sufficient to permit the cam lips 6, 7, of the tongues to snap into the recesses 11 of the bolt shank in firm, positive substantially locked engagement with the shoulders 13 presented thereby to resist any tendency toward reverse movement or withdrawal therefrom. At the same time, the bowed side portions 2 are elongated such that the generally concave base of the spring nut is tensioned and assumes the position of a substantially flat section Figs. 4 and 6 which, in attempting to assume its initial, normal untensioned concave configuration, naturally tends to transmit a lifting force to the tongues to draw the shank of the bolt axially thereby taking up any clearance in the parts secured and firmly and rigidly securing the same under continuous spring tension in a substantially locked installation.

It has been found that this most effective locking and drawing action of a spring nut to provide a tight, rigid installation is best obtained when the generally concave base thereof is flattened without any substantial pressure being exerted on the tongue elements themselves; any substantial pressure on the tongues prevents the same from having smooth, sliding engagement with the shank of the bolt fastening on being applied, and also bends the tongues with respect to the generally concave base such that the cam lip extremities thereof are deformed out of position for most effective contact with the shoulders 13 on the shank, whereupon the tongues might have a tendency to slip and permit the spring nut to loosen from applied fastening position in a tightened installation. This application of the spring nut to fastening position is preferably effected by the use of a special tool comprising spaced jaws which may be fitted to the side portions 2 of the generally concave base thereof without materially contacting the tongue elements. Thus, by a substantial axial thrust, pressure may be applied to the said side portions to flatten the same and tension the generally concave base of the spring nut with the cam lip extremities 6, 7 of the tongues thereof seated in the recesses 11 of the bolt as best seen in Figs. 5 and 6; and accordingly, when the tool is withdrawn and the attendant pressure removed from the said flattened side portions, the compression therein causes the cam lips of the tongues to positively engage the shoulders 13 of the bolt and simultaneously exert an axial drawing action thereon in providing a locked, tightened installation under continuously effective spring tension.

Figure 7:
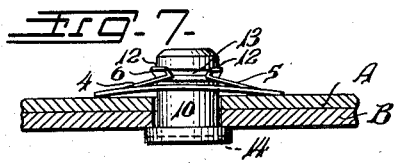
Figs. 7 and 8 are sectional and plan views corresponding respectively to Figs. 4 and 5 but showing the bolt and spring nut fastening members as rotated relative to each other substantially ninety degrees in position for quick easy release and ready separation from each other.
Figure 8:
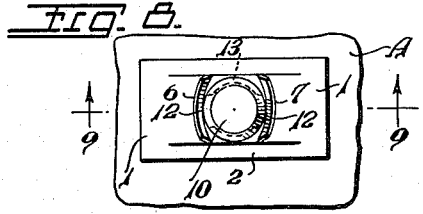
Figure 9:
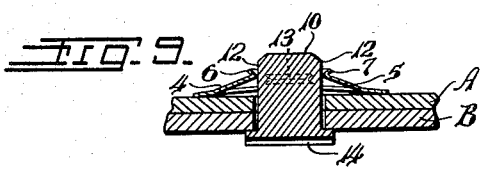
Fig. 9 is a section taken on line 9—9 of Fig. 8.

The positive locked fastening engagement of the bolt and spring nut as shown in Figs. 4 to 6 inclusive may be easily and quickly released by a simple, relative rotation of the fastening members substantially ninety degrees, to the general position represented in Figs. 7 to 9 inclusive wherein the cam lip extremities 6, 7, are forced out of engagement with the shoulders 13 of the bolt fastening and disposed at the unindented areas 12 thereof, in which position the bolt and spring nut may be readily separated by a suitable axial force on the bolt or substantial pull on the spring nut. It will be understood that any such relative turning movement of the bolt and spring nut, necessarily spreads the tongues apart and forces the cam lips 6, 7 to ride out of engagement with the shoulders 13 on the bolt and engage the unindented areas 12 thereof. Thus the bolt and spring nut are released from positive locked fastening engagement and the said cam lips are disposed merely in frictional engagement with the bolt in such position as to be readily removed therefrom in the manner aforesaid.

Figure 10:
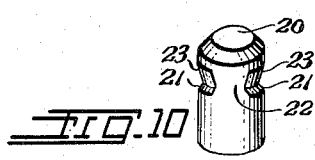
Fig. 10 is a fragmentary perspective of the shank of a bolt fastening employed with an alternate form of spring nut fastening device of the invention.
Figure 11:
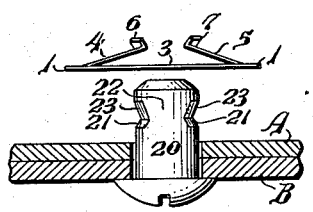
Fig. 11 is a sectional view of an installation embodying an alternate form of spring nut comprising a substantially flat base the same being shown in position about to be applied to the shank of a bolt fastening such as shown in Fig. 10.
Figure 12:
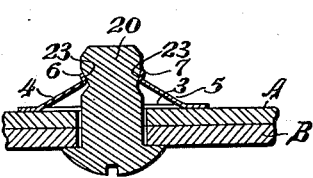
Fig. 12 is a view similar to Fig. 11 with the bolt and spring nut in applied fastening position and represented in section to show in detail the elements providing the positive locked fastening engagement of this form of the improved fastening means.

Figs. 10 to 12 inclusive show a further embodiment of the invention in which the spring nut is of the same general character as that described with reference to Figs. 1 to 9 inclusive, but is formed with a substantially flat base and employed in a somewhat different manner with the bolt shank to provide the desired spring tension and axial drawing action making for a rigid, tight installation. As shown in Fig. 10, the bolt shank 20 is formed with grooves 21 providing opposed relatively long cam shoulders 23 separated by unindented areas 22. With the side or bridge portions 3 of the spring nut formed substantially flat as shown in Fig. 11, the tongues 4, 5 are so designed that the cam lip extremities 6, 7 thereof are spaced apart in normal untensioned relation a distance substantially equal to or less than the diameter of the bolt between the bottoms of the grooves 21. Accordingly, the fastening members thus provided are easily and quickly connected in fastening engagement simply by pressing the same together such that the entering end of the bolt spreads the tongues apart sufficient to seat the cam lips 6, 7 thereof on the relatively long cam shoulders 23 of the bolt substantially as shown in Fig. 12. In this position, the tongues of the spring nut naturally tend to assume their initial normally untensioned relation and accordingly, cause the cam lips 6, 7 to ride on the relatively long cam shoulders 23 thereby exerting an axial drawing action on the bolt to provide a rigid, tight, substantially locked installation of the parts secured under continuously effective spring tension. The bolt and spring nut fastening members of this form of the invention may be easily and quickly released from such substantially locked fastening engagement in the same general method described with reference to Figs. 7 to 9 inclusive; thus upon a substantially quarter turn relative rotary movement of the fastening members from the position shown in Fig. 12, the cam lip extremities are forced out of engagement with the shoulders 23 of the bolt fastening and disposed at the unindented areas 22 thereof whereupon the bolt and spring nut may be readily separated by a suitable force on the bolt or substantial pull on the spring nut.

Figure 13:
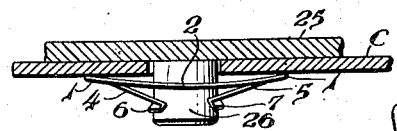
Fig. 13 illustrates a further embodiment of the invention in which a member secured onto an apertured supporting part is provided with a substantially smooth, plain shank serving as a connecting stud to which a spring nut of the type shown in Fig. 1 is applied for releasably mounting said member in an installation.
Figure 14:
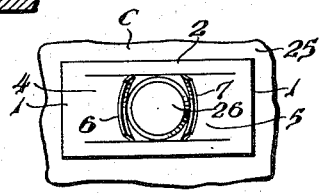
Fig. 14 is a bottom plan view of Fig. 13.

Although the distinct forms of the spring nuts represented in Figs. 1 and 11 respectively, are shown in connection with bolt fastenings having grooved shanks, it will be readily appreciated that either form provides an effective highly satisfactory fastening arrangement when employed with a shank which happens to be substantially plain and smooth throughout its length. Inasmuch as such plain shank elements are the least expensive to provide, they are employed whenever possible on practically any object to be secured in an installation. For example, as shown in Figs. 13 and 14, an object 25 of relatively thin cross-section and insufficient thickness to receive a threaded fastener or metallic insert without being exposed, is best provided with fastening means in the manner of an integral connecting shank 26 formed on the underface thereof to project through an aperture in the support C in position for the application thereto of a spring nut preferably of the type shown in Fig. 1. In the applied mounted position of the object on the support, the cam lips 6, 7 of the spring nut frictionally and grippingly engage the smooth connecting shank in positive fastening engagement therewith, while the generally concave base thereof exerts an axial pull thereon to draw the object into close flush engagement with the support under continuous spring tension substantially in the manner aforesaid. By virtue of the cam lip arrangement on the tongue extremities the spring nut may be readily released from the stud fastening simply by employing a suitable wedging tool, such as a screw driver, in a manner to cause the cam lips to gradually creep along the connecting shank to finally disengage therefrom and permit the spring nut to be removed.

Fig. 15 shows a further form of a spring nut designed for use, for example, in an installation wherein the rear side of a supporting part in an assembly becomes inaccessible in a substantially blind location. In such instances, it becomes necessary to provide the spring nut with suitable means whereby the same may be attached to the supporting part and held in proper self sustaining position preparatory to the application thereto of a bolt fastening or other shank member securing an object or cooperating part to the supporting part. Inasmuch as the spring nut is a unitary sheet metal device, a most practical form of such attaching means may be provided in the manner of integral thread engaging elements 27, 28, struck and formed preferably from extended end sections of the spring nut, although similar elements may just as well be provided from widened side portions 3, or the like. A spring nut of this character otherwise includes cam lip formations 6, 7 on the tongues thereof substantially similar to the forms of devices illustrated in Figs. 1 and 11, and accordingly by means of said thread engaging elements 27, 28, the device may be readily attached to the rear side of a supporting part D by screws 30, 31, as shown in Fig. 16 with the tongues 4, 5, thereof overlying a bolt or stud passage 32 provided in said part. By this arrangement, practically any bolt fastening may be applied to substantially locked fastening engagement with the spring tongues by a simple pushing operation taking place entirely from the accessible side of said supporting part. For purposes of illustration, an object 25' such as described with reference to Figs. 13 and 14, comprising a substantially plain connecting shank 26', is shown secured to the supporting part in a completed installation, Fig. 17, with the spring tongues frictionally and grippingly engaging said shank to retain the object in applied mounted position but capable of being released if desired by suitable reverse axial force on the connecting shank to cause the same to gradually work loose from engagement with the cam lips 6, 7 of the spring tongues and eventually become separable therefrom.

Figs. 18 and 19 illustrate a further embodiment of the invention in which the general type of spring nut and attaching means therefor shown in Figs. 15 to 17 inclusive, may be employed in a substantially blind location as the means for mounting a knob, handle or like object onto the supporting member D. Such an object 35 may of course assume any desired shape or configuration and is provided with a projecting bolt fastening 36 fixedly secured thereto, for example, by a threaded metallic insert 37. The projecting shank of the bolt fastening is grooved adjacent the free end thereof to provide an annular relatively long cam shoulder 38 operatively engaging the cam lip extremities 6, 7 of the spring nut tongues substantially in the manner described with reference to the form of device shown in Figs. 11 and 12. Since in this embodiment the groove and cam shoulder 38 preferably extend around the entire periphery of the bolt shank, said shank may be applied at random to fastening engagement with the tongues of the spring nut to mount the knob, handle or other object in any desired position on the supporting part D. In this position the cam lip extremities 6, 7 of the tongues ride on the cam shoulder 38 on the bolt shank in attempting to assume their normal untensioned relation thereby exerting an axial drawing action on the shank to draw the object secured to close flush engagement with the support under continuously effective spring tension in providing a rigid positive locked mounting which is not subject to displacement or accidental removal.

Referring to Fig. 19, it will be understood that the object thus secured is dismountable from the installation by effecting a release of the bolt shank from the tongues of the spring nut in a relatively simple procedure by which the cam lip extremities 6, 7 are forced apart sufficient to permit removal of the bolt shank therefrom. This operation of course must usually take place entirely from the forward, accessible side of the supporting part D and accordingly, by effecting a substantially lateral turning moment on the bolt shank 36 by means of a wedging tool or through suitable force on the object 35, a torque is exerted on the bolt shank to cause the cam shoulder 38 to cam against the cam lip tongue extremities 6, 7, transversely thereof and thus gradually spread the same apart until the bolt shank is removable therefrom.

Figs. 20 to 22 inclusive show a still further embodiment of the invention in which the previously described spring nut comprising attaching means 27, 28 is employed in a substantially blind or inaccessible location together with a form of bolt fastening designed for use where frequent release of the fastening members is required, as in a substantial coupling construction or similar temporary fastening means. Such a bolt fastening 40 may comprise a head having a tool recess 41 and a shank 42 having one or more cutaway portions providing reduced areas, the opposing faces 43 of which are of less spacing than the distance between the cam lip extremities 6, 7 of the spring nut tongues. The surfaces 44 however are of full diameter and accordingly such a bolt fastening is admirably suited as the stud fastening for securing a part 45 to supporting member D as shown in Fig. 20, with said surfaces 44 in positive fastening engagement with cam lip 6, 7 of the tongues of the spring nut. If desired, the bolt fastening may be formed with grooves or ribs presenting shoulders on the surfaces 44 in providing a substantially locked fastening installation substantially as described with reference to Figs. 11 and 12. In any event, the fastening members thus provided are easily and quickly released by a simple, relative rotary movement of the bolt shank substantially ninety degrees to the position shown in Figs. 20 and 21, wherein the faces 43 of the reduced areas thereof are out of contact with the tongues such that the bolt fastening may be easily and quickly removed therefrom and the parts of the assembly readily disassociated.

In the several installations appearing in Figs. 15 to 22 inclusive it is fully contemplated as within the scope of the inventiton that various other means in place of the thread engaging elements 27, 28 be employed for attaching the spring nut to a supporting part in any installation in which it is desired that the same be retained in self-sustaining position prior to the application of the cooperating bolt fastening thereto. In this respect, highly satisfactory arrangements may be provided in the use of rivets, eyelets, spot welding, clip or clasping arms, anchoring prongs or lugs and various related forms of securing means for holding the spring nut in such self-sustaining position on the supporting part.

Figs. 23 and 24 show a preferred form of spring nut provided with such alternate attaching means in the manner of substantial clip holding arms 50, 51 at either end of the spring nut. Thus the spring nut may be attached to a supporting part E, Fig. 23, for example, by applying the fastener through an assembling opening 52 in said part, or otherwise slidably engaging said holding arms in slots 53, 54 provided on a free edge of the part to clasp the same on its opposite faces as shown in Fig. 24, thereby holding the spring nut in assembled relation thereon with tongues 4, 5 overlying the passage 56 in position to receive the cooperating bolt fastening. The bolt of course may be similar to any of those shown in the previously described forms of the invention; however, for purposes of illustration, a completed installation is shown embodying the reduced shank type of bolt fastening 40 appearing in Figs. 20 to 22 inclusive which secures member 55 to the supporting part E and is designed to effect an easy quick release of the fastening members by a simple quarter turn rotary movement of the bolt shank out of engagement with the cam lips 6, 7 of the spring nut tongues.

Figs. 25 and 26 show the use of further alternate means for attaching the spring nuts onto similar supporting parts in registration with suitable bolt passages provided therein, Fig. 25 illustrating the application of substantial rivets or eyelets 60, 61 securing the base of the spring nut to supporting part F, while Fig. 26 shows the spring nut secured to a supporting part G by means of spot-welding 62, 63, applied preferably through apertures provided in the base of the spring nut.

In manufacturing the various forms of devices in accordance with the invention, it is usually found advantageous to standardize the size of the spring nuts and provide bolt fastenings having shanks of different lengths such that the devices may be readily adapted to securing various thicknesses of material, as will be readily understood. In this respect the spring nuts also have an advantageous function inasmuch as they comprise resilient bases carrying yieldable tongues which of course flex to a certain degree and thus permit the use thereof with a certain size bolt fastening for securing any of several thicknesses of parts.

It is quite apparent that numerous advantages are inherent in the improved spring nut constructions of the present invention, one of the foremost of such advantages residing in the provision of cam lips on the tongues, which cam lips in any embodiment of the invention are spaced apart in normal untensioned relation a distance less than that between the diametric points of fastening engagement with the bolt fastening employed therewith, whether a substantially smooth, threadless connecting stud or shouldered bolt shank element or the like. Thus by this arrangement, it has been seen that the bolt engaging elements in any form of the improved spring nut not only provide a positive, rigid fastening engagement with the cooperating bolt fastening under continuously effective spring tension, but also provide for an easy quick release of a bolt and spring nut from applied fastening position without in any way deforming, mutilating or otherwise damaging either of the fastening members such that the same may be frequently separated and again fastened together any number of times over a long period of use with freedom from all difficulties. By contrast, practically all heretofore known forms of spring nuts not only require a tedious operation for removal but also usually result in a deformation and mutilation of the fastening members such that they are less efficient and often useless when again employed in the installation from which they were removed.

While this invention has been described in detail with specific examples, such examples are intended as illustrations only, since it will be apparent to those skilled in the art that other modifications in the construction, arrangement and general combination of parts may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. A sheet metal fastening structure comprising a base provided with an opening, cooperating yieldable bolt retaining elements provided from the material of said base with the free ends thereof adjacent said opening, said bolt retaining elements terminating in bent portions forming substantial lips on the extremities thereof, said lips defining substantially plane surfaces inclined with respect to the general planes of the remaining portions of said bolt retaining elements.

2. A sheet metal fastening structure comprising a base provided with an opening, cooperating yieldable stud securing elements provided from the material of said base with the free ends thereof adjacent said opening, said stud securing elements terminating in bends adjacent said free ends thereof, said bends providing substantial lips on the extremities of said stud securing elements extending outwardly therefrom in the direction away from said base, said lips defining substantially plane surfaces inclined with respect to the general planes of the remaining portions of said stud securing elements.

3. A sheet metal fastening structure for use with a cooperating threadless bolt or connecting stud fastening, said sheet metal fastening structure comprising a base and a pair of cooperating bolt retaining elements struck and formed therefrom, said bolt retaining elements terminating in bent portions forming substantial lips having surface engagement with said bolt shank in frictional, gripping relation therewith, said lips being adapted to be spread apart to permit said bolt shank to be disengaged from said bolt retaining elements without mutilation or distortion thereof.

4. A sheet metal fastening structure for use with a cooperating threadless bolt or connecting stud fastening having a shoulder provided on the shank thereof, said sheet metal fastening structure comprising a generally concave base when normally untensioned and a pair of cooperating bolt retaining elements struck and formed therefrom, said bolt retaining elements terminating in bent portions forming substantial lips having surface engagement with said shoulder on the bolt shank in gripping relation therewith, said generally concave base being adapted to exert an axial drawing action on the bolt shank through said bolt retaining elements to provide a tightened installation under continuously effective spring tension.

GEORGE A. TINNERMAN.